United States Patent [19]
Jane Cabagnero

[11] Patent Number: 5,669,625
[45] Date of Patent: Sep. 23, 1997

[54] FOLDING CHILD'S PUSHCHAIR

[75] Inventor: Ramón Jane Cabagnero, Palau de Plegamans, Spain

[73] Assignee: Jane, S.A., Palau de Plegamans, Spain

[21] Appl. No.: 534,867

[22] Filed: Sep. 27, 1995

[30] Foreign Application Priority Data

| Mar. 29, 1995 | [ES] | Spain | 9500831 U |
| Jun. 16, 1995 | [ES] | Spain | 9501654 U |
| Sep. 5, 1995 | [ES] | Spain | 9502272 U |

[51] Int. Cl.$^6$ ................................................ B62B 7/08
[52] U.S. Cl. ................................ 280/647; 280/47.38
[58] Field of Search ................... 280/38, 37, 638, 280/639, 642, 643, 647, 648, 650, 655, 657, 658, 47.18, 47.25, 47.38, 47.39

[56] References Cited

U.S. PATENT DOCUMENTS

| 3,736,021 | 5/1973 | MacLaren | 280/39 |
| 4,173,355 | 11/1979 | Perego | 280/650 |
| 4,353,577 | 10/1982 | Giordani | 280/642 |
| 4,844,504 | 7/1989 | Bigo | 280/647 |
| 5,004,253 | 4/1991 | Nakao | 280/648 |
| 5,348,325 | 9/1994 | Abrams | 280/655 |
| 5,516,142 | 5/1996 | Hartan | 280/642 |
| 5,558,405 | 9/1996 | Ishikura et al. | 280/38 |

FOREIGN PATENT DOCUMENTS

| 483042 | 4/1992 | European Pat. Off. | 280/650 |
| 40 22 391 | 10/1991 | Germany | 280/647 |

*Primary Examiner*—Brian L. Johnson
*Assistant Examiner*—Frank Vanaman
*Attorney, Agent, or Firm*—Jacobson, Price, Holman & Stern, PLLC

[57] ABSTRACT

Comprises a frame (1) with the legs (7) of the handlebar slideable on the front feet (6) and from which legs (7) is actuated the device for locking and unlocking the folding, the lower ends of the legs (7) of the handlebar being connected to the rear feet (10) by means of two hingedly (15) crossed arms (13 and 14). The upper ends of the front feet (6) each include a guiding strap (12) to which are hingedly connected respective vertical arms (11) which connect said feet (6) to the rear feet (10). The frame (1) bears a seat (2), a back (3) hingedly (4) connected to same, an armrest (19), and a front handrail (40). The pushchair is characterized in that the seat (2) is hingedly (18) connected at the rear, by its sides (5), to the vertical arms (11), at a middle portion, to each of the armrests (19), by means of a tie rod (20), and, at its front end, through further respective tie rods (21), to the front end (16) of the legs (7) of the handlebar.

11 Claims, 3 Drawing Sheets

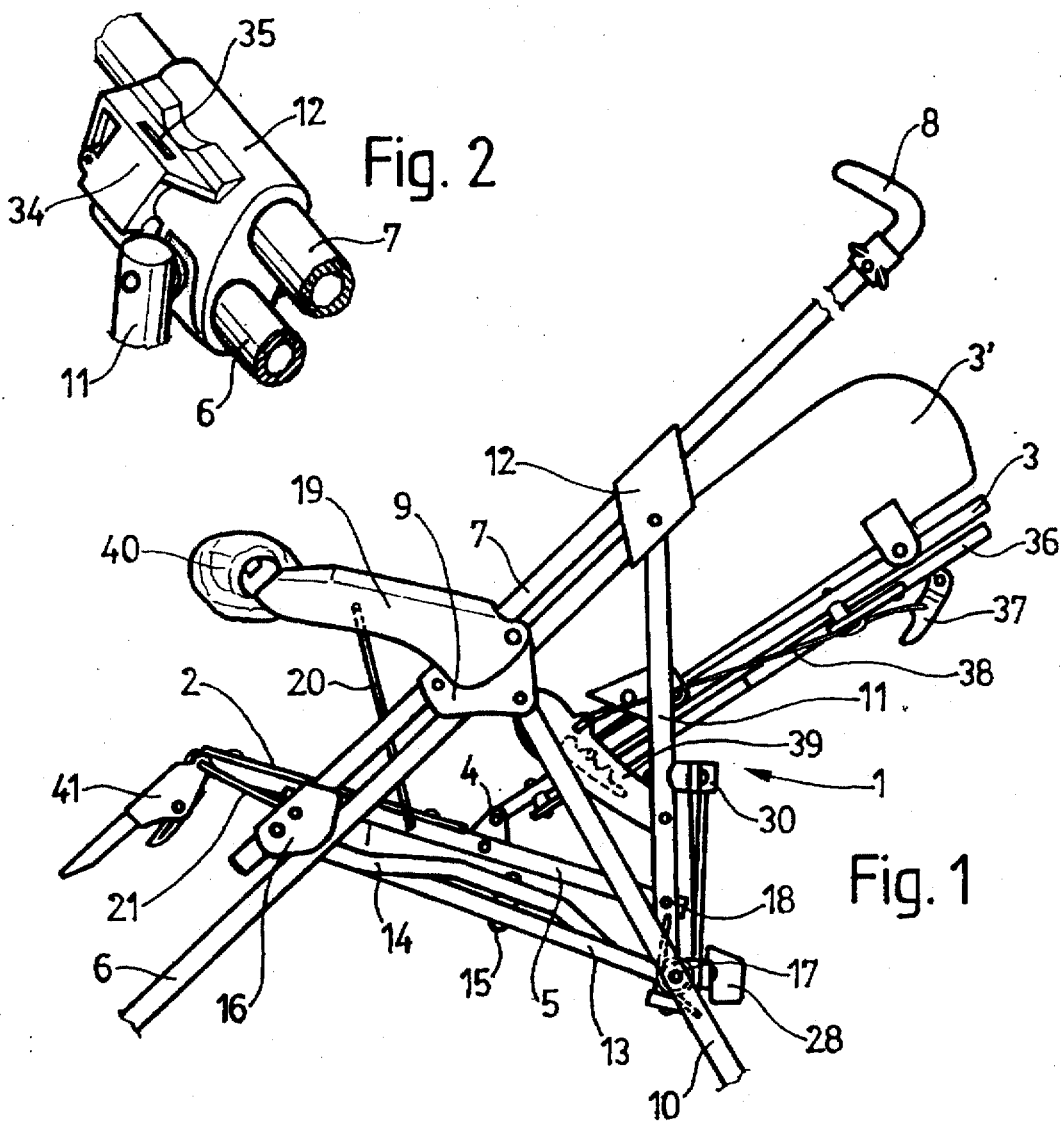
Fig. 2
Fig. 1
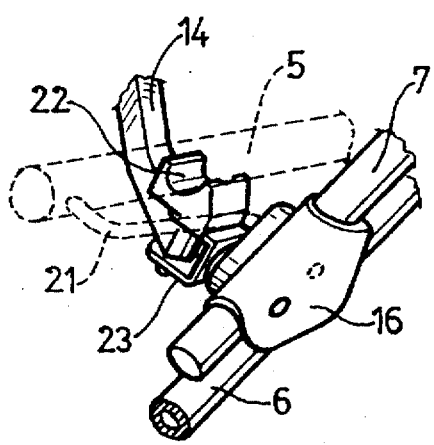
Fig. 3
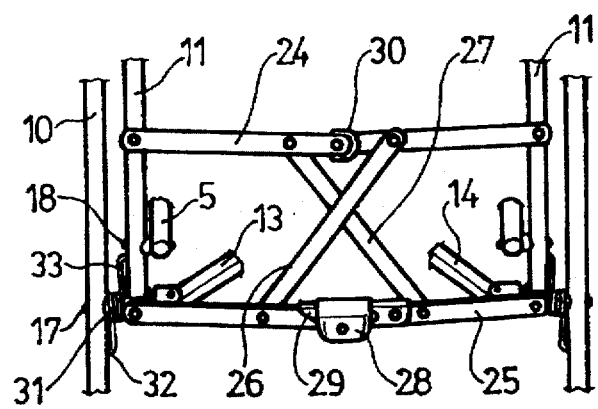
Fig. 4

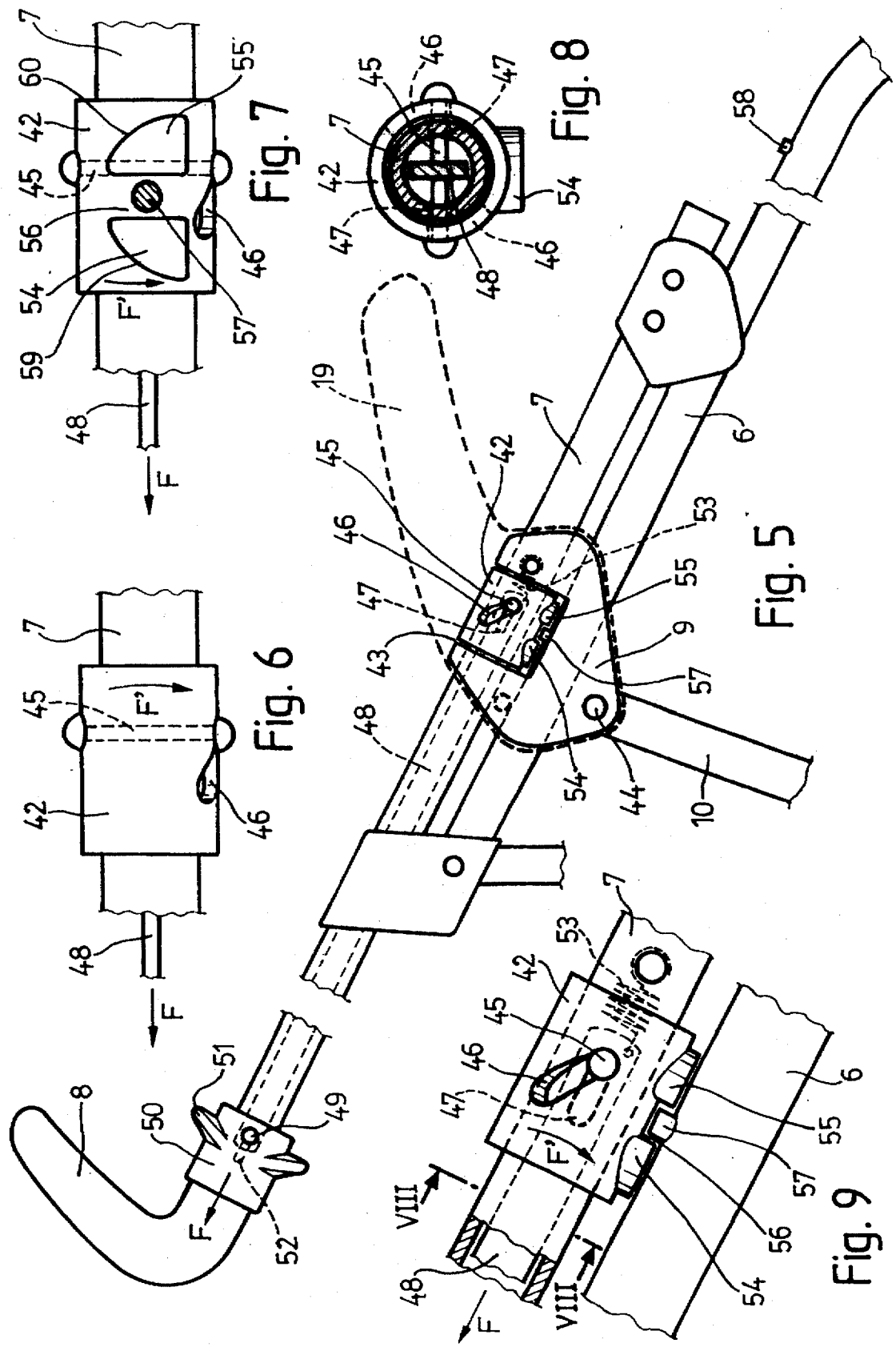

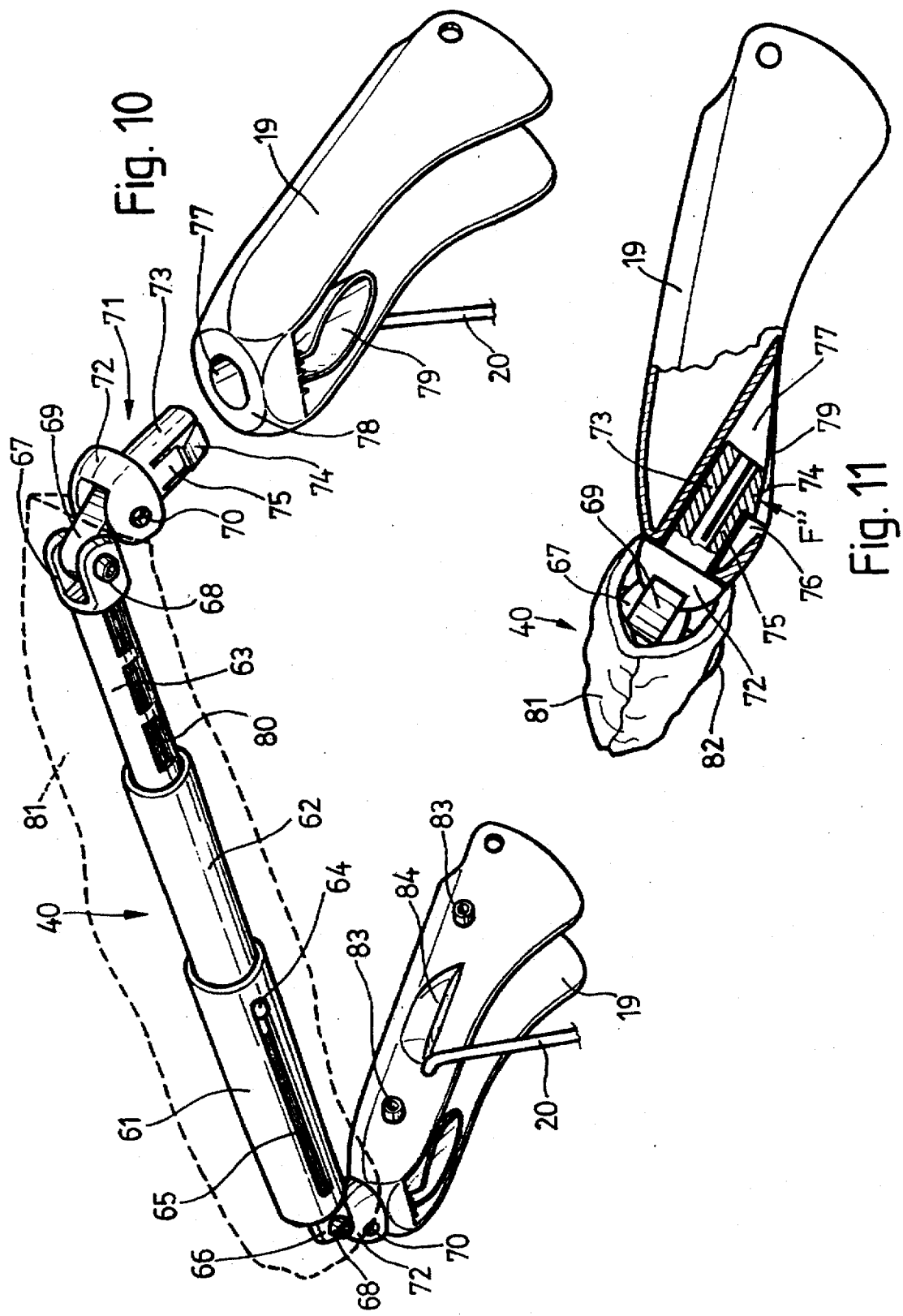

FOLDING CHILD'S PUSHCHAIR

BACKGROUND OF THE INVENTION

This invention relates to a folding child's pushchair.

There exist various models of folding child's pushchairs, among which can be mentioned those comprising a frame with the legs of the handlebar slideable on the front feet, the lower ends of the legs of the handlebar being connected to the rear feet by means of two hingedly crossed arms. The upper ends of the front feet each include a guiding strap to which are hingedly connected respective vertical arms which connect said feet to the rear feet. The frame bears a seat with a hinged back with armrests, and with a front handrail.

These pushchairs comprise a device for locking and unlocking the folding frame in which device is actuated from the legs of the handlebar by means of an inner tie rod pulled by a spring.

This tie rod actuates an active member which locks the folding and unfolding positions of the pushchair by being coupled to a stud provided for at the lower portion and the upper portion of the front feet, respectively.

There are known active members of different constitution, either hook-shaped or hinged lever-shaped or the like.

There are also known various models of front handrails for protecting the children in the pushchairs, which are coupled to the foremost portion of the armrests of same.

Generally, the handrails are finished at their ends each with a hinged branch which is removably fitted onto the respective armrest.

In the pushchairs which fold in the transverse direction, in addition to the downward direction, these handrails have been provided with lengths hinged with respect to each other, in order to so allow said folding. Although the folding of the pushchair can effectively occur by urging the armrests towards each other, the handrail is folded protruding at the front portion of the pushchair or forming a protrusion towards the inside of same, with the resulting problems of increasing the volume of the folded state or making more difficult the compact folding of the pushchair.

SUMMARY OF THE INVENTION

The child's pushchair which is the subject of this invention is in particular of the type mentioned and has a series of features intended for achieving a pushchair with a simple structure, a high strength and which is easy to be operated by the person who has to handle same.

The device for locking and unlocking the folding includes a simple safely operating active member which, in addition, due to its constitution, remains concealed from view, since it remains hidden in the very structure of the pushchair.

One of the features of this pushchair resides in the arrangement of the seat which is hingedly connected at the rear, by its sides, directly to the rear vertical arms of the frame, is hingedly connected, at its middle portion, to the armrests, each by means of a tie rod, and is hingedly connected, at the front end of said sides, through further tie rods, to the front end of the legs of the handlebar, said sides of the seat resting with their front portion on the front support of the crossed arms linked to said front end of the legs of the handlebar.

Another feature refers to the link between both vertical arms which is effected, at their lower portion, by means of a double strut provided with crossed tie rods. In order to achieve an automatic unfolding of the frame, there has been provided, engaged into the spindle for hinging the vertical arms on the rear feet, a helical spring which is secured by its ends to said arm and foot, respectively.

Another feature is provided in that a small box, which acts as a support for removably coupling a hood, parasol or sunblind, is integrated into the guiding strap integral with the upper end of the front feet with which it forms a single moulded part.

The device for locking and unlocking the folding is characterized in that the active member consists in a bushing freely rotatingly engaged onto the legs of the handlebar, through which bushing passes a pin which fits with some backlash in opposite oblique apertures of same and in opposite longitudinal apertures of the leg of the handlebar and which passes as well through the lower end of the tie rod.

Said bushing includes, at its periphery and facing the front foot, two protrusions which leave between each other a traverse passageway at which coincides the stud of the upper portion of the foot to lock the unfolding of the pushchair, or the stud of the lower portion of the foot to lock the folding of the pushchair.

In order to achieve a compact folding of the pushchair, there has been provided, in this invention, a handrail of telescopic lengths which automatically extend or retract when unfolding or folding the pushchair. The coupling branches have a head from which extends tubular connection bearing a resilient tooth which engages an inner detent of a recess provided for in the armrest and in which is accomodated said tubular connection, which recess is open at the lower side, in order to have access to said tooth.

The telescopic lengths have between each other longitudinal guiding means which impede them from unexpectedly rotating with respect to each other, thus always ensuring their correct arrangement for their coupling to the armrests of the pushchair, and the coupling branches are coupled to the ends of the handrail by means of respective rods.

These and further features will be more clearly understood from the detailed description which follows, the understanding of which will be facilitated with reference to the attached three drawing sheets in which has been represented a practical embodiment which is given only as a non-exhaustive example of the reach of this invention.

BRIEF DESCRIPTION OF THE DRAWINGS

In the drawings:

FIG. 1 shows a side elevational view of the whole of the push-chair,

FIG. 2 shows a perspective detailed view of the guiding strap attached to the upper end of the front foot, FIG. 3 is a perspective detail view of the front portion of the sides of the seat, FIG. 4 shows a rear elevational view of the double strut which connects both vertical arms to each other, FIG. 5 shows a side elevational view of the middle area of the frame of the pushchair in which is located the active member of the device for locking and unlocking the folding, FIGS. 6 and 7 show this active member as seen in upper plan view and in lower plan view, respectively, FIG. 8 is a front elevational view of the active member in cross-section on line IV—IV of FIG. 9, FIG. 9 is a detail view to a larger scale of this active member, as seen in side elevational view, FIG. 10 shows a perspective view of the front handrail, at one end, coupled to and, at the other end, uncoupled from the armrests, and FIG. 11 shows a partly cross-sectional side elevational view of the handrail coupled to the armrest.

DESCRIPTION OF THE PREFERRED EMBODIMENT

According to the drawings, the pushchair comprises a frame 1 provided with a seat 2 with a back 3 provided with wings 3' and hingedly connected at 4 to the sides 5 of the seat. The frame has two front feet 6 finished with corresponding wheels (not shown) on which are slideable the legs 7 of the handlebar with an "umbrella"-type grip 8, which are integral, in an intermediate area, with a guiding strap 9 engaged onto the front feet and to which are hingedly connected, at their upper end, the corresponding rear foot 10 finished with relevant wheels (neither shown). The rear feet 10 are hingedly connected to the upper end of the front feet by means of respective vertical arms 11 hingedly connected, at the upper side, to a guiding strap 12 engaged onto leg 7 of the handlebar.

The sides of this frame are connected to each other, under seat 2, by means of two arms 13 and 14 hinged at 15 with respect to each other, which arms are hingedly connected, at their front end, to the front ends of the legs 7 of the handlebar by means of straps 16 for resting on the front feet 6 and are hingedly connected, at their rear end, to the vertical arms 11, at the spindle 17 where same are hingedly connected to the rear feet.

The sides 5 of the seat are hingedly connected, at the rear, by means of the spindle 18, directly to the lower portion of the vertical arms 11, at their middle portion, to the armrest 19, by means of tie rods 20, and, at their front end, through further tie rods 21, to the strap 16 integral with the front end of the legs 7 of the handlebar.

The front end of the sides 5 of the seat rests against a grooved part 22 integral with the fork-like holder 23 to which are coupled the front ends of the crossed arms 13 and 14, which fork-like holder is coupled to the guide 16 (FIG. 3).

The vertical arms 11 are hingedly connected to each other, at their lower portion, by means of two struts 24 and 25 in turn hingedly connected to each other by means of two crossed tie rods 26 and 27. The lower strut has an actuating pedal 28 and an unfolding stop 29, while the upper strut includes a convex protrusion 30 which facilitates the manual supporting which helps unfolding the pushchair (FIG. 4).

On the spindle 17 engaged between the rear foot 10 and the vertical arm 11 is a helical spring 31 which is secured, at one end 32, to the foot, while it is secured, at the other end 33, to the vertical arm.

The guiding strap 12 has at the outer side, on its inner face, a small box 34 with an upper opening 35 to which will be coupled, by means of the corresponding means, the hood, parasol or sunblind (not shown), said small box forming one single moulded part together with the guiding strap 12 (FIG. 2).

The back 3 comprises a longitudinal central plate 36 to which is hingedly connected, at the rear side, a control 37 which, through a wire 38, acts on the means 39 for locking the various positions of inclination of the back.

The front ends of the armrests 19 are prepared for receiving the removable coupling of a transversally folding front handrail 40.

To the front end of the sides 5 of the seat are hingedly connected the side supports 41 of a footrest.

The locking and unlocking device includes an active member formed by a bushing 42 engaged, freely rotating about the leg 7 of the umbrella-grip 8 type handlebar, into an aperture 43 of the guiding strap 9 through which slides the corresponding front foot 6 and to which is hingedly connected, by means of a pin 44, the upper end of the relevant rear foot 10.

Through this bushing 42 passes a pin 45 which fits with some backlash in opposite oblique apertures 46 of same and in opposite longitudinal apertures 47 of the leg 7 of the handlebar, and which passes as well through the lower end of a tie rod 48 which is connected at its upper end, by means of a pin 49, to a control 50 formed by a sleeve provided with opposite protrusions 51 for supporting the fingers, which sleeve is movably engaged at the upper portion of the leg 7 of the handlebar at which the pin 49 fits with some backlash in opposite apertures 52.

At its lower end, the tie rod 48 is connected to a spring 53 which pulls same downwards.

The bushing 42 includes, at its periphery and facing the front foot 6, two protrusions 54 and 55 which leave between each other a traverse passageway 56 (FIG. 7) at which coincides a stud 57 of the upper portion of the front foot to lock the unfolding of the pushchair, or a stud 58 of the lower portion of this foot to lock the folding position of the pushchair.

The unlocking of the unfolding and folding positions of the pushchair is achieved by actuating the tie rod 48 upwards by pulling the sleeves 50 in the direction of arrow F. The pin 45 thereby rises, longitudinally guided by the apertures 47 of the leg of the handlebar and causes the bushing 42 to rotate in the direction of arrow F' as the pin moves in the oblique apertures 46 of same.

Through this rotation of the bushing, the protrusions 54 and 55 which lock the corresponding stud 57 or 58 of the front foot release same, the leg 7 of the handlebar then being capable of freely moving on this foot.

The protrusions 54 and 55 of the bushing 42 have their traverse edges 59 and 60, opposite the passageway 56 they form, obliquely bent, in order to automatically determine the rotation of the bushing when said edges strike against the corresponding stud 57 or 58, thereby facilitating the free sliding of the leg of the handlebar over the foot when changing from the unfolding position to the folding position of the pushchair or vice-versa.

The presence of the bushing 42 remains hidden when an armrest 19 is coupled onto the guiding strap 9.

The handrail 40 is formed by three lengths 61, 62 and 63 telescopically coupled to each other and including means for longitudinally guiding them with respect to each other which impede them from rotating with respect to each other, which means are formed by protrusions 64 of the lengths 62 and 63 which fit with some backlash in apertures 65 provided for in the lengths 61 and 62. Only the protrusion on length 62 and the aperture on length 61 in FIG. 10. The protrusion on length 63 and the aperture on length 62 are on the opposite side of the handrail.

The ends of the handrail are finished in a fork-shape 66 and 67 to each of which is hingedly connected, through a spindle 68, a connecting rod 69, which rods are in turn hingedly connected, by means of a spindle 70, to the coupling branches 71 which have a head 72 from which extends a tubular connection 73 which has, at its lower portion, a tooth 74 formed by a longitudinal elastic tongue 75, which tooth engages, when coupling the handrail 40 to the armrests 19, an inner detent 76 (FIG. 11) of a recess 77 provided for in the front end 78 of the armrests, against which strikes the head 72.

The recess 77 has a lower opening 79 for having access to the tooth 74, in order to achieve, by pressing same F", the release of the handrail from the armrests.

The solid length 63 has lengthwise recesses 80 at either side, in order to eliminate raw material and weight, and the handrail 40 is wrapped by a soft tubular sheath 81 which is fixed by means of male press-studs 82 which are each coupled to a female press-stud formed by the heads of the very spindles 68.

The armrests 19 have on their inner face female press-studs 83 for coupling the sides of the upholstery of the seat and comprise a longitudinal protrusion 84 by means of which the armrests, when the pushchair is folded, rest on the tie rods 20 which are hingedly connected to the sides of the seat.

The upholstery which covers the seat, with its back and the footrest, should advantageously be removably fitted.

I claim:

1. Folding child's pushchair comprising a frame having a handlebar with legs, front feet and rear feet, the legs of the handlebar slidable on the front feet and from which legs is actuated a device for locking and unlocking the frame for folding, the legs of the handlebar having lower ends connected to the rear feet by means of two hingedly crossed arms; the front feet having upper ends which each include a guiding strap to which guiding straps are hingedly connected respective vertical arms which connect said front feet to the rear feet; the frame bearing a seat, a back hingedly connected to the seat; armrests and a front handrail connecting the armrests, characterized in that the seat is hingedly connected at its rear, by its sides to the vertical arms at a lower portion of each vertical arm, the seat further being connected, to each of the armrests, by means of a tie rod, and, at its front end, through further tie rods, to the legs of the handlebar.

2. Folding child's pushchair according to claim 1, characterized in that a front portion of the seat rests on a front support of the crossed arms.

3. Folding child's pushchair according to claim 1, characterized in that the vertical arms are hingedly connected to each other, at their lower portion, by a double strut provided with two crossed connecting rods.

4. Folding child's pushchair according to claim 1, including a hinging spindle connecting the vertical arms to the rear feet and a helical spring on said spindle which is secured, at its ends, to said vertical arms and rear feet, respectively.

5. Folding child's pushchair according to claim 1, characterized in that each guiding strap integrally includes a small box which forms a support for removably coupling one of a hood, parasol and sunblind.

6. Folding child's pushchair according to claim 1, characterized in that the device for locking and unlocking the frame consists in a bushing freely rotatingly engaged on a leg of the handlebar, through said bushing passing a pin which fits with backlash in opposite oblique apertures of the bushing and in opposite longitudinal apertures of the leg of the handlebar, and which passes as well through the lower end of an inner tie rod within the leg of the handlebar, the tie rod being pulled by a spring connected with the leg of the handlebar.

7. Folding child's pushchair according to claim 6, characterized in that the bushing includes, at its periphery and facing one of the front feet, two protrusions which have between each other a transverse passageway to engage a first stud on an upper portion of said one of the front feet to lock the frame in an unfolded position of the pushchair, and a second stud on a lower portion of said one of the feet to lock the frame in a folded position of the pushchair.

8. Folding child's pushchair according to claim 7, characterized in that unlocking of the frame from the unfolded and folded positions of the pushchair is achieved by actuating the tie rod upwards, whereby the pin longitudinally guided by the apertures in the leg of the handlebar causes the bushing to rotate as the pin moves in the oblique apertures of the bushing whereby the protrusions which lock the respective stud on said one of the front feet release the stud, the leg of the handlebar then being capable of freely moving on said one of the front feet.

9. Folding child's pushchair according to claim 7, characterized in that the protrusions of the bushing have transverse edges, opposite said passageway which are obliquely bent, in order to automatically determine the rotation of the bushing when said edges strike against one of said studs, thereby providing free sliding of the leg of the handlebar over said one of the feet.

10. Folding child's pushchair according to claim 1, characterized in that the front handrail is formed by lengths telescopically coupled to each other and in that it includes branches for coupling to the armrests which branches each have a head from which extends a tubular connection bearing a resilient tooth which engages an inner detent of a recess provided in one of the armrests and in which is accommodated said tubular connection, which recess is open at a lower side for providing access to said resilient tooth.

11. Folding child's pushchair according to claim 10, characterized in that the telescopic lengths have means for longitudinally guiding them with respect to each other which impede them from rotating with respect to each other, and in that the branches are coupled to ends of the handrail, each by means of a connecting rod.

* * * * *